United States Patent [19]
Okino et al.

[11] Patent Number: 5,580,618
[45] Date of Patent: Dec. 3, 1996

[54] LCD ARTICLE FROM LIQUID CRYSTAL FILLED, HYDROPHILICALLY-COATED, POROUS PTFE FILM

[75] Inventors: Kouichi Okino, Okayama; Kazuhiko Ohashi, Okayama-ken; Sunao Fukutake, Okayama, all of Japan

[73] Assignee: Japan Gore-Tex, Inc., Tokyo, Japan

[21] Appl. No.: 495,066

[22] Filed: Jun. 26, 1995

[30] Foreign Application Priority Data

Jun. 30, 1994 [JP] Japan .................................. 6-171688

[51] Int. Cl.$^6$ .................................................. C09K 19/52
[52] U.S. Cl. .................... 428/1; 252/299.01; 252/299.5; 349/122
[58] Field of Search .......................... 428/1; 252/299.01, 252/299.5; 359/74, 75

[56] References Cited

U.S. PATENT DOCUMENTS

| | | | |
|---|---|---|---|
| 4,161,557 | 7/1979 | Suzuki et al. | 428/1 |
| 5,056,898 | 10/1991 | Ma et al. | 359/94 |
| 5,093,735 | 3/1992 | Doane et al. | 359/52 |
| 5,130,024 | 7/1992 | Fujimoto et al. | 210/500.36 |
| 5,304,323 | 4/1994 | Arai et al. | 252/299.5 |
| 5,405,551 | 4/1995 | Reamey et al. | 252/299.01 |
| 5,410,424 | 4/1995 | Konuma et al. | 359/51 |

FOREIGN PATENT DOCUMENTS

| | | |
|---|---|---|
| 0357234 | 7/1990 | European Pat. Off. . |
| 0484163 | 5/1992 | European Pat. Off. . |
| 0512397 | 11/1992 | European Pat. Off. . |
| 0520800 | 12/1992 | European Pat. Off. . |
| 0599483 | 1/1994 | European Pat. Off. . |

*Primary Examiner*—Mark Nagumo
*Attorney, Agent, or Firm*—Gary A. Samuels

[57] ABSTRACT

A liquid crystal-containing precursor for a liquid crystal display device consisting of a porous polytetrafluoroethylene film which has the structure defining the pores treated with a hydrophilic substance. The pores of the treated porous film are substantially filled with liquid crystals. The hydrophilizing treatment increases the transition speed of the liquid crystals from light-scattering orientation to light-transmitting orientation. The liquid crystal-filled film can be covered with transparent non-porous layers of material, having an electrically-conductive film on at least one surface, which can be hermetically sealed at the edges, to permit long-term storage of the liquid crystals in ready-to-use sheet form and easy inclusion into a liquid crystal display device.

13 Claims, No Drawings

LCD ARTICLE FROM LIQUID CRYSTAL FILLED, HYDROPHILICALLY-COATED, POROUS PTFE FILM

FIELD OF THE INVENTION

This invention relates to an article containing liquid crystals, more particularly, to a porous polytetrafluoroethylene (PTFE) matrix sheet impregnated with liquid crystals.

BACKGROUND OF THE INVENTION

Optical devices which use liquid crystal displays, for example, optical shutters, light adjusting glasses, alphanumeric display panels, and the like, are well known in the art. Such devices use liquid crystals selected from among the many known types which, when subjected to an electric current or electromagnetic field, can be caused to change their orientation so that they are arranged in a light-scattering (opaque) mode or light-transmitting (transparent) mode. The devices are generally composite layered constructions having at least one liquid crystal layer sandwiched between two transparent substrates, or one transparent substrate and one reflecting substrate. The transparent substrates can be made of glass, synthetic polymer films, etc., and typically include a thin transparent electrode material layer or pattern on the surface in contact with the liquid crystal layer.

In the past, in order to manufacture liquid crystal displays, transparent substrates having transparent electrodes and oriented polymeric films on them were prepared. The transparent substrates, with the transparent electrodes and oriented films facing each other, were spaced apart with numerous spacers, several micrometers in diameter, interspersed between them to provide a constant gap. Liquid crystals were injected into the gap between the substrates to form a liquid crystal layer between the substrates. Such injection operations were extremely time consuming, requiring 6 to 12 hours to produce elements for displays having large image planes (about 10 inches, or 25.4 centimeters, in size).

More recently, liquid crystal display layers consisting of a porous matrix material in which liquid crystal compounds are contained has been proposed. For example, Japanese Laid-Open Patent Application 56-11436 discloses an article consisting of a porous matrix sheet of acrylonitrile-based copolymer, polypropylene, or polycarbonate impregnated with liquid crystals, laminated between two sheets of 50 micrometers thick polyester film having transparent vapor-deposited indium oxide electrode layers on them. Although improving the manufacture of liquid crystal displays, the article described above exhibits poor retentivity of the liquid crystals introduced into it, so the liquid crystals must be impregnated into it, by a time consuming and difficult procedure, at the, time the liquid crystal display is manufactured. Also, the electrode substrates, i.e., the polyester cover films, of the article require an orientation treatment in order to obtain desired orientational properties in the liquid crystals.

In Japanese Laid-Open Patent Application No. 1-198725 and its U.S. counterpart, U.S. Pat. No. 5,304,323 (to Arai, et al.), is disclosed a liquid crystal layer formed by first mixing together a low molecular weight liquid crystal compound and a polymerizable monomer miscible with the liquid crystal compound. The mixture is then coated onto a substrate and laminated to another substrate, or infused between two substrates, after which the monomer is polymerized to form a polymer matrix. During polymerization, phase separation of the forming polymer and the nematic liquid crystal takes place resulting in a continuous liquid crystal phase in a three-dimensional polymer matrix. These devices, however, suffer problems such as low electrical resistance and low durability resulting from contamination of the liquid crystal phase by polymerization catalysts or impurities in the monomer; or difficulty in developing desired strength properties in the matrix material.

In European Patent Application No. EP 0 512 397 A2 (to Yoshinaga, et al.) is disclosed a liquid crystal device in which the liquid crystal display layer comprises a porous polymeric matrix, preferably formed from a polymer film from which all contaminants have been removed. Preferably the polymer film is stretched to develop porosity which eliminates the likelihood of contamination from pore-forming materials. The porous matrix films are preferably of polymers having a surface energy of 20 dyne-cm or less; especially preferred is polytetrafluoroethylene. The porous polymer film, preferably about 50 micrometers thick, is laminated using an adhesive between substrates which may include transparent electrodes of indium-tin-oxide (ITO), $SnO_2$, or a metal, on the surfaces to be contacted by the liquid crystals. A liquid crystal compound is then injected into the space between the substrates and drawn in by capillary action and/or vacuum to fill the pore volume of the matrix material which, as noted above, is a difficult, time consuming, and expensive procedure. To overcome the above-listed problems associated with assembling liquid crystal display devices, the inventors of the instant application prepared a precursor assembly for a liquid crystal display device as disclosed in European Patent Application No. EP 0 599 483 A1 (to Okino, et al.). The precursor assembly comprises a porous polytetrafluoroethylene film having its pores substantially filled with nematic liquid crystals. Both surfaces of the liquid crystal-filled polytetrafluoroethylene film are covered by non-porous synthetic polymer films and the edges of the layered assembly are hermetically sealed. The precursor assembly is easily and quickly manufactured and permits long term storage of liquid crystals in ready-to-use sheet form for easy inclusion into a liquid crystal display. In use in a liquid crystal display device, the precursor assembly provides highly contrasting bright (transparent) and dark (light scattering) modes, however, it suffers the drawback that the rates at which it switches from one mode to the other is slower than is desired.

SUMMARY OF THE INVENTION

The article of the invention provides a precursor assembly for a liquid crystal display device in which liquid crystals are contained in a ready-to-use manner. The article is easily and quickly manufactured, permits long-term storage, facilitates handling and simplifies manufacturing of the liquid crystal display device. The article further provides for quick switching of the liquid crystals from at least one orientation mode to another, for example, from the light-scattering mode to the light-transmitting mode.

The article comprises a porous polytetrafluoroethylene film having a structure defining interconnected pores and having a pore volume in the range of 50 to 98 percent. The surfaces of the structure defining the pores are coated with a hydrophilic substance so as to maintain porosity in the film. The pores defined by the coated surfaces are substantially filled with liquid crystals.

By porous as used herein is meant a structure of interconnected pores or voids such that continuous passages and pathways throughout a material are provided.

By transparent as used herein is meant the capability of transmitting light with little or no loss in intensity.

DETAILED DESCRIPTION OF THE INVENTION

Porous polytetrafluoroethylene films, as noted above, have been used as the matrix material to contain liquid crystals in a display layer of a liquid crystal display device. Polytetrafluoroethylene is well known for its physical and chemical properties which include excellent resistance to chemicals, broad service-temperature range (from over 250° C. to cryogenic temperatures), resistance to degradation by oxidation, sunlight, or ultraviolet radiation, and high dielectric characteristics that make it suitable for use as a matrix material to contain liquid crystals in a liquid crystal display device. Polytetrafluoroethylene is also noted for having excellent release, or non-stick, properties, as well as being extremely hydrophobic. It strongly resists wetting by water (contact angle about 108°), and is only wet by liquids having a surface tension of about 20 dyne-cm or less.

The article of the instant invention is a result of the discovery that by increasing the surface energy of the surfaces defining the pores of a porous polytetrafluoroethylene film, for example by coating them with a hydrophilic substance, unoriented liquid crystals contained within the coated porous structure can be made to assume a highly oriented light-transmitting mode much more quickly than if contained within an untreated porous polytetrafluoroethylene film.

The porous polytetrafluoroethylene film should have certain physical and optical properties that make it suitable for use in an element for a liquid crystal display. The polytetrafluoroethylene film need not be transparent in and of itself, nor must the material have the same refractive index as the liquid crystals to be impregnated into it, so long as the desired transparency can be obtained when its pores are filled with the liquid crystals. The porous polytetrafluoroethylene film should be thin, having a thickness in the range of 3 to 50 micrometers, preferably in the range of 5 to 20 micrometers. A thickness in excess of 50 micrometers is undesirable because of reduced light transmissivity through the film, even when filled with liquid crystals oriented in the light-transmitting mode. When the film is less than 3 micrometers thick it is not sufficiently opaque, even when filled with liquid crystals in the light-scattering mode. The porous polytetrafluoroethylene film should have a pore volume of 50 to 95 percent, preferably in the range 85 to 95 percent. High pore volume enhances transparency by reducing the amount of light-interfering material present in the polytetrafluoroethylene matrix film. However, a balance must be achieved between pore volume of the film and film strength required for handling. A pore volume in excess of 95 percent can lead to a film too weak to be filled with liquid crystals, or too open to retain them. The nominal pore size of the film should be 1 to 10 micrometers, preferably in the range 1 to 5 micrometers. Larger pore sizes, while easier to fill, can lead to problems with retention of the liquid crystals in the film. Pore sizes smaller than 1 miicrometer are more difficult to fill with liquid crystals. The porous polytetrafluoroethylene film, because of the well known chemical inertness of polytetrafluoroethylene, provides a matrix that will not affect, nor be affected by, the liquid crystals in its pores, and thus provides stable unchanging properties to the assembly.

The porous polytetrafluoroethylene film can be made by method is known in the art, for example, by papermaking processes, by processes which include mixing polytetrafluoroethylene with filler materials that are subsequently removed, and by stretching and expansion processes. Preferably, the porous polytetrafluoroethylene film is a film of expanded polytetrafluoroethylene having a porous structure of nodes interconnected by fibrils. Such films can be made by uniaxial or biaxial stretching of polytetrafluoroethylene according to the methods disclosed in U.S. Pat. Nos. 3,953,566 and 4,187,390, incorporated herein by reference.

As noted earlier, by treating the porous polytetrafluoroethylene film to increase the surface energy of the structure defining the pores, a surprising effect was obtained in that the speed at which liquid crystals contained in the pores in an unoriented light-scattering mode switched to oriented light-transmitting mode was significantly increased. A means to increase the surface energy of the polytetrafluoroethylene structure can be to treat the polytetrafluoroethylene with a fluorine-containing polymer having hydrophilic groups.

A suitable fluorine-containing polymer is a hydrophilic fluorine-containing copolymer comprising units of a fluorine-containing ethylenically unsaturated monomer and units of a non-fluorinated vinyl monomer containing a hydrophilic functional group; where the fluorine content of the hydrophilic fluorine-containing copolymer is between 2 and 60 percent by weight of the copolymer, preferably between 10 and 60 percent, and the ratio of the formula weight of the recurring units of the copolymer to the number of functional groups is between 45 and 700. Such a hydrophilic fluorine-containing copolymer is fully disclosed in U.S. Patent Application No. 5,130,024 (to Fujimoro, et al.), and incorporated herein by reference. Examples of fluorine-containing monomers include, but are not limited to, tetrafluoroethylene, vinyl fluoride, vinylidene fluoride, monochlorotrifluoroethylene, dichlorodifluoroethylene, and hexafluoropropylene. Examples of hydrophilic monomers include, but are not limited to, vinyl alcohol, acrylic acid, methacrylic acid, fumaric acid, maleic acid, itaconic acid, and other unsaturated carboxylic acids, as well as alkylene oxide adducts of acrylic acid and methacrylic acid.

The hydrophilic fluorine-containing copolymer can be dissolved in an organic solvent, for example, an alcohol, a ketone, an ester, an amide, a hydrocarbon, or the like, and applied to the porous polytetrafluoroethylene film in solution form. Any conventional liquid application method can be used to impregnate the porous polytetrafluoroethylene film with the solution, and conventional drying methods can be used to remove the solvent. Examples of suitable impregnation methods include, immersion, spraying, roll-coating, and the like. The amount of copolymer in the solution is preferably less than 1 percent by weight. When the amount of copolymer in the solution exceeds 1 wt. %, the amount of dried copolymer coating the structure defining the pores may clog the pores, or otherwise excessively reduce the pore volume of the porous polytetrafluoroethylene film, and unnecessarily reduce the amount of liquid crystals which can be impregnated into the coated porous structure.

The liquid crystals to be impregnated into the porous treated polytetrafluoroethylene film may be selected from among many liquid crystal materials suitable for use in liquid crystal displays that are known in the art. No particular limitations are imposed. For example, nematic, smectic, and cholesteric liquid crystals, and the like, may be used. The liquid crystals will be selected according to the properties desired in the liquid crystal display and according to whether an electric field or magnetic field will be applied to change their orientation and related optical properties.

The liquid crystals can be impregnated into the porous treated polytetrafluoroethylene film by conventional methods such as by immersion of the film into the liquid crystals, or by coating methods such as spray-coating, roll-coating, and the like. It is important that the film be impregnated in a manner such that air or other gases, are essentially completely excluded from the pores, and that the pores are essentially completely filled with the liquid crystals. This can be accomplished, for example, by performing the operation in a vacuum chamber, or by vacuum degassing the fully impregnated film, preferably at a pressure of 20 Torr or lower.

Following impregnation of the liquid crystals into the porous treated film, at least one surface, and preferably both surfaces, of the porous liquid crystal-filled film should be covered with a non-porous cover layer which supports a conductive film or electrode pattern on one surface. At least one of the non-porous cover layers must consist entirely of transparent materials. A preferred transparent cover layer is glass coated with a conductive ITO film, although transparent films of synthetic polymers selected from the group consisting of, but not limited to, polyesters, polyimides, polyolefins, polyether sulfones, acrylic polymers, fluoropolymers, and silicone polymers can also be coated with conductive films, and can be used. Again, it is important to prevent air, or other gases, from being trapped between the layers, or otherwise placed in contact with the liquid crystals. The presence of air in contact with the liquid crystal material can lead to chemical degradation of the liquid crystals and, if present as bubbles, can cause unwanted diffraction or refraction of light, loss of transparency, and other spurious optical effects when used in a liquid crystal display. The non-porous cover layers are press-bonded to the surface of the liquid crystal-filled polytetrafluoroethylene film. No adhesives are used to adhere the layers together, because such use increases the thickness of the assembly, and can lead to non-uniformities in the thickness of the liquid crystal layer as well as create harmful optical effects. After the substrates are press-bonded to the liquid crystal-filled porous polytetrafluoroethylene layer, the edges of the assembly are hermetically sealed, for example, with an epoxy resin or other suitable sealant. Such sealants may include thermoplastic, thermosetting, or reaction-curing synthetic polymers, as are known in, the art. The layered article, as described above, provides liquid crystals in a sheet form which is easy to handle, and which can be easily incorporated into a liquid crystal display. The layered article can be prepared for use in a simple separate operation and, furthermore, because the liquid crystals are hermetically sealed, can be stored, ready for use, for long periods of time. Moreover, the layered article of the invention requires no special orientation treatment for use in a liquid crystal display.

EXAMPLE 1

A biaxially stretched porous expanded polytetrafluoroethylene film (GORE-TEX PTFE membrane, made by Japan Gore-Tex, Inc.) having a thickness of 10 micrometers, a pore volume of 93 percent, and a nominal pore diameter of 2 micrometers was treated with a fluorine-containing polymer.

The porous polytetrafluoroethylene film was treated in accordance with the method disclosed in U.S. Pat. No. 5,130,024. The hydrophilizing agent was a tetrafluoroethylene-vinyl alcohol copolymer (100% saponified; 27 wt. % fluorine content; 14.5 millimoles/gram hydroxyl group content) dissolved in a 4/1 methanol/ethanol solution at a copolymer concentration of 0.2 wt. %. The porous polytetrafluoroethylene film was impregnated with the solution by immersion, fixed to a drying frame, and dried to remove the solvent for 5 minutes at a temperature of 60° C.

The porous treated film was impregnated with nematic liquid crystals (LIXON 2101-OOOXX, made by Chisso Sekiyu Kagaku KK) by a coating technique. The liquid crystal-impregnated film was then vacuum degassed in a vacuum chamber, at a pressure of approximately 10 Torr.

The liquid crystal-filled film was press-bonded between cover layers of 1.1 mm thick glass which was coated on one surface with a 100 angstrom thick film of ITO having a resistivity of 100 ohms per square. The edges were sealed; thus forming a liquid crystal display panel comprising an article of the invention.

EXAMPLE 2

Example 2 was prepared as described in Example 1, except that the porous expanded polytetrafluoroethylene film was 8 micrometers thick and had a pore volume of 85%.

Comparative Example 1

A comparative example was prepared as described in Example 1, except that no hydrophilizing treatment was applied to the porous expanded polytetrafluoroethylene film.

Comparative Example 2

A comparative example was prepared as described in Example 2, except that no hydrophilizing treatment was applied to the porous expanded polytetrafluoroethylene film.

The examples described above were tested by applying electric current at different voltages (60 Hz) to cause the liquid crystals to change from light-scattering orientation to light-transmitting orientation. The time (milliseconds) required from 10% of the transition to 90% of the transition (based on the change in parallel light transmittance) was measured using a digital oscilloscope. The results are shown in Table 1.

TABLE 1

|  | 10 V | 15 V | 20 V | 25 V | 30 V |
| --- | --- | --- | --- | --- | --- |
| Example 1 | 1.0 ms | 0.7 ms | 0.5 ms | 0.35 ms | 0.2 ms |
| Example 2 | 0.8 ms | 0.65 ms | 0.4 ms | 0.3 ms | 0.18 ms |
| Comp. Ex. 1 | 8 ms | 3 ms | 2 ms | 1.5 ms | 1.2 ms |
| Comp. Ex. 2 | 7 ms | 2.7 ms | 1.9 ms | 1.4 ms | 1.2 ms |

We claim:

1. A composite article for a liquid crystal display comprising:
   (a) a porous polytetrafluoroethylene film having throughout the film a structure defining interconnected pores, said film having a pore volume in the range of 50 to 98 percent;
   (b) a substance coated on the structure defining said pores of said porous film so as to maintain porosity in said porous film, said substance having a moiety which increases the surface energy of said structure defining said pores;
   (c) liquid crystals, said liquid crystals substantially filling said pores defined by said coated surfaces.

2. The composite article for a liquid crystal display as recited in claim 1 wherein the porous polytetrafluoroethylene film has a pore volume of 85 percent or greater.

3. The composite article for a liquid crystal display as recited in claim 2 wherein the substance is a fluorine-containing polymer having hydrophilic groups.

4. The composite article for a liquid crystal display as recited in claim 3 wherein the substance is a hydrophilic fluorine-containing copolymer comprising (i) units of a fluorine-containing monomer, and (ii) units of non-fluorinated vinyl monomer containing a hydrophilic functional group.

5. The composite article for a liquid crystal display as recited in claim 4 further comprising one or more layers of non-porous materials, in contacting relationship, disposed on each side of said polytetrafluoroethylene film filled with liquid crystals;

the materials forming the layers on at least one side of said film being transparent and comprising an electrically-conductive electrode material.

6. The composite article for a liquid crystal display as recited in claim 3 further comprising one or more layers of non-porous materials, in contacting relationship, disposed on each side of said polytetrafluoroethylene film filled with liquid crystals;

the materials forming the layers on at least one side of said film being transparent and comprising an electrically-conductive electrode material.

7. The composite article for a liquid crystal display as recited in claim 2 further comprising one or more layers of non-porous materials, in contacting relationship, disposed on each side of said polytetrafluoroethylene film filled with liquid crystals;

the materials forming the layers on at least one side of said film being transparent and comprising an electrically-conductive electrode material.

8. The composite article for a liquid crystal display as recited in claim 1 further comprising one or more outer layers of non-porous materials, in contacting relationship, disposed on each side of said polytetrafluoroethylene film filled with liquid crystals;

the materials forming the outer layers on at least one side of said film being transparent and comprising an electrically-conductive electrode material.

9. The composite article for a liquid crystal display as recited in claim 1 wherein the substance is a fluorine-containing polymer having hydrophilic groups.

10. The composite article for a liquid crystal display as recited in claim 9 wherein the substance is a hydrophilic fluorine-containing copolymer comprising (i) units of a fluorine-containing monomer, and (ii) units of non-fluorinated vinyl monomer containing a hydrophilic functional group.

11. The composite article for a liquid crystal display as recited in claim 10 further comprising one or more layers of non-porous materials, in contacting relationship, disposed on each side of said polytetrafluoroethylene film filled with liquid crystals;

the materials forming the layers on at least one side of said film being transparent and comprising an electrically-conductive electrode material.

12. The composite article for a liquid crystal display as recited in claim 9 further comprising one or more layers of non-porous materials, in contacting relationship, disposed on each side of said polytetrafluoroethylene film filled with liquid crystals;

the materials forming the layers on at least one side of said film being transparent and comprising an electrically-conductive electrode material.

13. A method for making a composite article for a liquid crystal display comprising the steps of:

(a) impregnating a solution containing a substance having a hydrophilic moiety into a porous polytetrafluoroethylene film, said film having a pore volume in the range of 50 to 98 percent;

(b) drying said impregnated film to remove the solvent, thereby forming a coating of the substance on the surfaces defining the pores of the film so as to maintain porosity in the film;

(c) impregnating liquid crystals into and substantially filling the pores defined by said coated surfaces;

whereby a handleable, substantially air-bubble-free, liquid crystal-filled polytetrafluoroethylene film suitable for use in a liquid crystal display is produced.

* * * * *